A. GREEN.
BALL AND SOCKET JOINT FOR LINKWORK.
APPLICATION FILED SEPT 27, 1919.
1,375,905.
Patented Apr. 26, 1921.
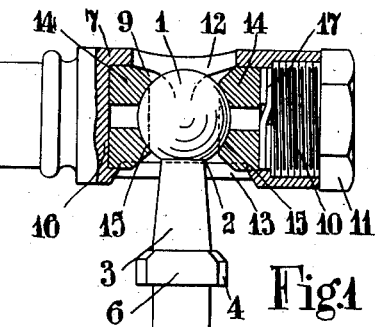
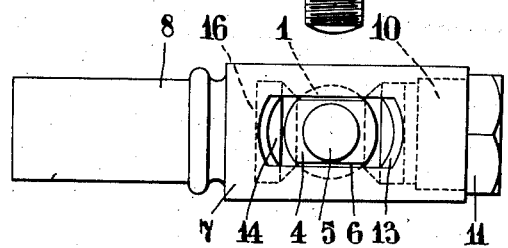
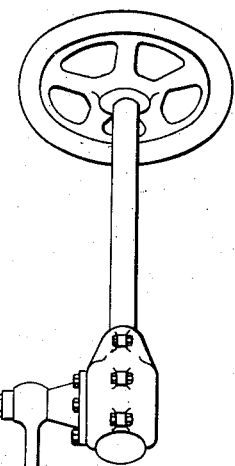
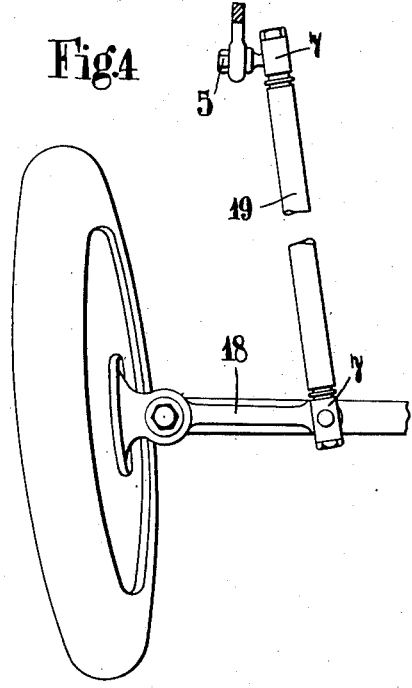
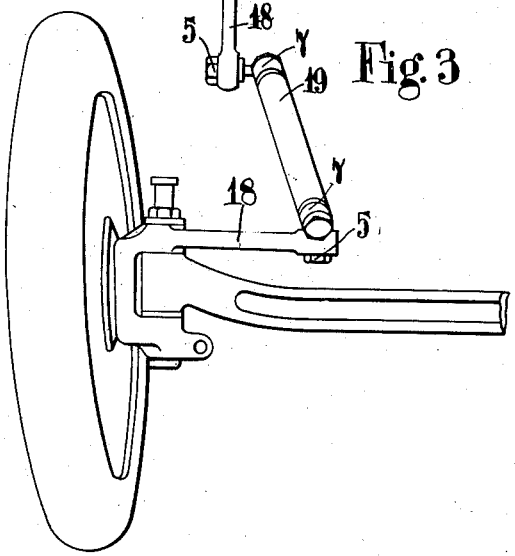
INVENTOR
A. Green,
BY H. R. Kerslake
ATTORNEY

UNITED STATES PATENT OFFICE.

ARTHUR GREEN, OF COVENTRY, ENGLAND.

BALL-AND-SOCKET JOINT FOR LINKWORK.

1,375,905. Specification of Letters Patent. Patented Apr. 26, 1921.

Application filed September 27, 1919. Serial No. 326,911.

*To all whom it may concern:*

Be it known that I, ARTHUR GREEN, a subject of the King of Great Britain and Ireland, and residing at "Wilga," Warwick avenue, Coventry, in the county of Warwick, England, have invented certain new and useful Improvements in or Relating to Ball-and-Socket Joints for Linkwork, of which the following is a specification.

The invention relates to improvements in knuckle or ball-and-socket joints, for example such as are used in the steering gear of motor vehicles.

The object of the invention is to provide a ball and socket joint of simple, reliable and substantial construction. The present invention provides a ball-and-socket joint having its two elements, the "ball" and "socket" respectively in forms adapted to be fastened to levers and links respectively of any length.

In the practical working of motor vehicles fastening devices occasionally work loose and serious accidents have occurred through the working loose of a knuckle joint of a steering gear. When this happens with a cap of a steering knuckle joint of many well-known types, the two elements—the lever and the connecting link— become separated, and the steering gear becomes suddenly absolutely inoperative. With my invention, should the cap work loose or considerable wear take place, there is only a looseness between the lever and the connecting link, which cannot get separated. Such looseness becomes quickly apparent but the steering gear performs its functions, if somewhat imperfectly, even if all the portions of the ball joint except the socket and ball pieces, work loose and are lost.

In a steering gear a relatively large angular movement between the two elements has to be provided in one plane, and a smaller angular movement at right angles to the said plane.

The present invention consists in a ball and socket joint comprising a ball stud with a shoulder or flange adapted to be fastened to the end of a lever or link, a socket piece bored longitudinally and also transversely in such manner as to permit the shoulder of the ball stud to pass completely through and to retain the ball, two pad pieces between which the ball is held lodged in the longitudinal bore of the socket piece, and a cap screwed or otherwise fastened to the end of the socket piece and retaining the said parts in their assembled position.

The invention also consists in a ball and socket joint as set forth, comprising a spring interposed between the cap and the adjacent pad piece.

The invention also consists in a ball and socket joint substantially as hereinafter described with reference to the accompanying drawings.

Referring now to the accompanying drawings which illustrate the invention as carried into effect in one form:—

Figure 1 is a sectional elevation of the joint;

Fig. 2 is an inverted plan of the joint;

Figs. 3 and 4 are a front view and plan respectively of the joint applied to the steering gear of a motor vehicle.

The ball stud comprises a ball 1 at one end, a neck 2 of small diameter but of sufficient strength to transmit the acting stresses, a shank 3 having an elongated flange 4 and a threaded end 5 adapted to be screwed or otherwise detachably fastened to an element of the linkwork presenting a surface of equal or greater dimensions than the flange. The ball stud is conveniently made by turning to a suitable profile and then cutting away the flange 4 and part of the shank 3 to two parallel flat surfaces 6, or turning the flange to a diameter smaller than that of the ball. The socket piece 7 is conveniently made a turned bar of cylindrical form; one end 8 being adapted to be fastened preferably permanently to an element of the linkwork. A hole 9 is bored in the body from the other end to a convenient depth along the longitudinal axis of the piece and threaded at its mouth 10 to receive a screw cap 11. A hole 12 through which the ball piece may easily pass is pierced transversely through one side of the body of the socket piece while an elongated slot 13 adapted to pass over the elongated flange 4 of the ball piece is cut through the opposite side of the socket piece about the same center. Two cylindrical pads 14 each having one of its ends 15 cupped, co-spherical and in contact with the ball are placed within the longitudinal bore of the socket piece 7. One of the said pad pieces rests against the end wall 16 of the bore, and the other against a spring washer 17 adjacent to the screwed cap 11. In a steering gear as shown in Figs. 3 and 4 the threaded ends 5 of the ball studs are fixed to levers 18 at right angles to the axes of the respective levers, while the socket pieces 7 of the joints are connected by a link 19.

If desired, the completed joint may be inclosed by some known form of flexible cover in order to exclude dust and the like.

The slot 13 in the socket piece must be long enough and wide enough and of such form as to permit the said smaller longitudinal angular movement between the two elements, and as already stated, to permit the flange 4 of the ball piece being passed through. The surfaces 15 of the cupped pads 14 provide ample constraining surfaces and yet allow for sufficient relative angular movement.

Having now described my invention, what I claim as new and desire to secure by Letters Patent is:—

A ball and socket joint comprising a socket member provided at one end with a longitudinally bored socket having diametrically arranged apertures extending through its wall, a plug closing the open end of the socket, pads arranged in the socket and having oppositely disposed parti-spherical seats, a ball member having a spherical head arranged in the socket and engaging said seats and a shank fixed to said head and extending through one of said apertures, the aperture through which the shank extends being of sufficient length to permit a relatively large movement of the shank and of a width greater than the thickness of the shank to permit less movement of the shank in a direction at right angles to the first mentioned movement, the diameter of the spherical head being greater than the width of the last mentioned aperture to prevent the head from passing through said aperture, the other aperture being sufficiently large to permit the head to be passed through the same.

In testimony whereof I have signed my name to this specification.

ARTHUR GREEN.